Feb. 5, 1946.  A. SÁNCHEZ  2,394,109
COOLING APPARATUS
Filed Sept. 11, 1940  2 Sheets-Sheet 1

INVENTOR.
ANDREW SÁNCHEZ
BY
Henry L. Burkitt
ATTORNEY

Feb. 5, 1946.  A. SÁNCHEZ  2,394,109
COOLING APPARATUS
Filed Sept. 11, 1940  2 Sheets-Sheet 2
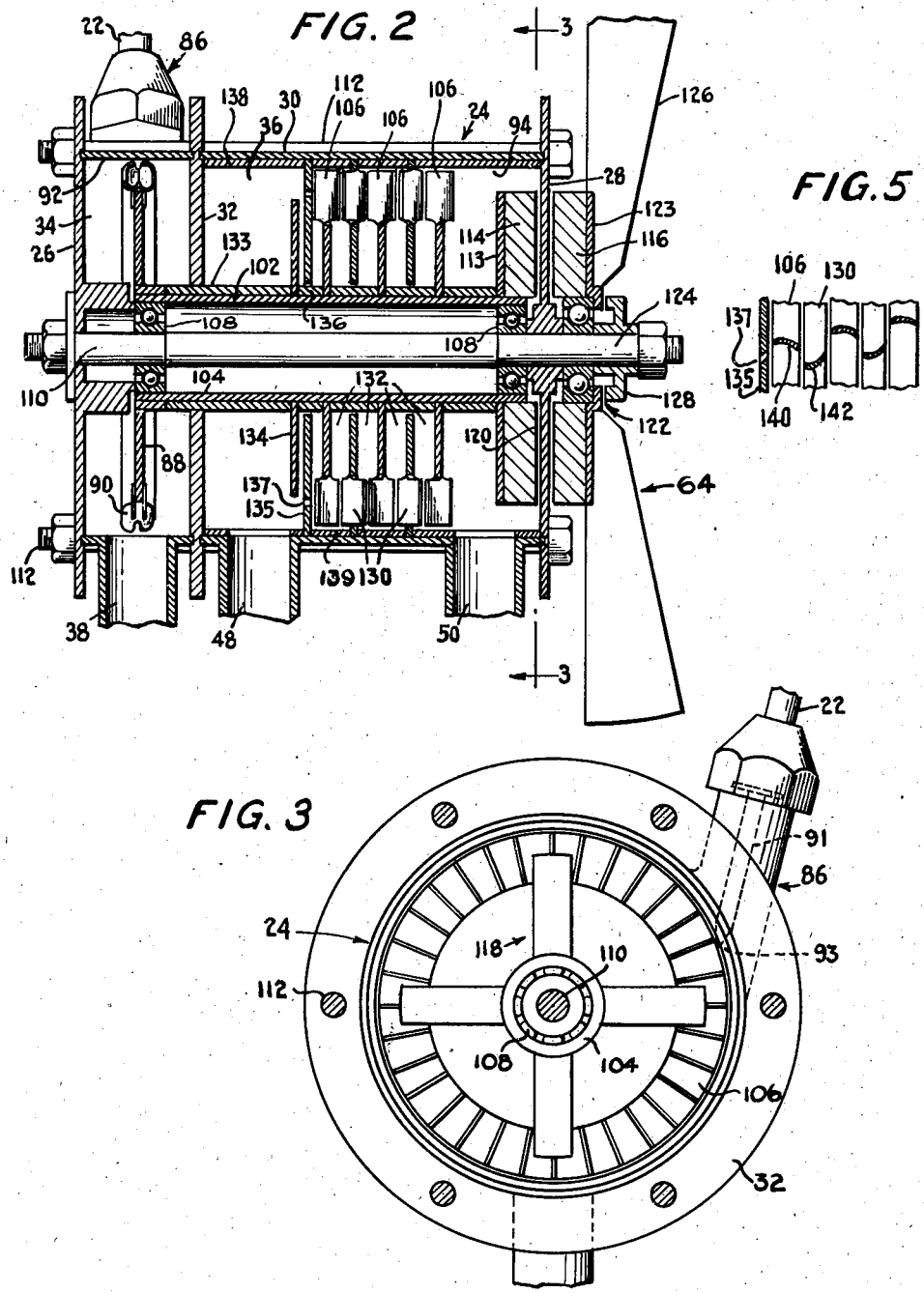
INVENTOR.
ANDREW SÁNCHEZ
BY
Henry L. Burkett
ATTORNEY Patented Feb. 5, 1946

2,394,109

UNITED STATES PATENT OFFICE 2,394,109

COOLING APPARATUS

Andrew Sánchez, New York, N. Y.

Application September 11, 1940, Serial No. 356,331

14 Claims. (Cl. 62—126)

This invention relates to cooling apparatus.

Especially in those installations where large chambers are to be refrigerated, or, for instance, in connection with so-called air-conditioning apparatus, the circulation of air past the cooling unit is of considerable importance. The usual method followed has been to provide flow-producing means such as a fan driven by an electric motor. In such cases, external energy is being introduced into the refrigerating cycle and, of course, must be absorbed and disposed of, with consequent reduction of the efficiency of the entire unit, since, in addition to the refrigeration for which the unit is provided, the total electrical energy input into the motor, whether dissipated as friction, motion or resistance heating, must be absorbed by the refrigerant.

It is an object of the invention to provide apparatus in which, although circulation of air past the refrigerating unit is induced by power-driven means, the refrigerating efficiency is in no way affected, and, in fact, may to a degree be increased.

For this purpose, as a part of the cycle between compressor, condenser, and evaporator, there is introduced means which may operate to control flow of refrigerant between compressor and evaporator, and which utilizes heat energy from the chamber for conversion into kinetic energy of the air within the chamber. Such conversion, of course, will result in reduction of temperature of the refrigerant, makes the refrigerant capable further of absorbing heat energy from the chamber, and thereby adds to the efficiency of the system. Thus the refrigerating cycle is not affected in the sense that a greater load is imposed upon it, but the load itself is utilized for the purpose of obtaining the necessary energy to effect circulation.

The refrigerant, after it has been compressed and condensed, is driven to the evaporator under the pressure derived from the compressor. Generally it passes through an expansion valve from the high pressure of the condenser, to the low pressure of the return to the compressor through the evaporator. When the refrigerant passes through the expansion valve, it receives a high velocity energy component. If this energy component be utilized, it will reduce the total heat content of the refrigerant, and thus make the refrigerant capable of absorbing additional heat units from the chamber of the refrigerator.

It is an object of the invention to provide apparatus which utilizes the velocity energy, present in refrigerant when it passes into cooling relationship to the chamber to be refrigerated, for driving air-circulating means within the chamber, in order to make the refrigerant more effective for cooling purposes.

The refrigerant passes into the evaporator and takes part in the refrigerating cycle by passing from the liquid state to the gaseous state and then, as it passes from the evaporator to the suction side of the compressor, it has further inherent velocity energy imposed upon it. At this stage of the refrigerating cycle, it is possible again to utilize heat energy present in the refrigerant to impart further kinetic energy to the air within the refrigerator by producing positive air currents, and thus further to make the refrigerant more effective for cooling the chamber.

It is an object of the invention to provide apparatus in which the refrigerant, as it passes from the liquid state to the gaseous state within a refrigerating chamber, is made to give up at least a part of its velocity energy for the purpose of imparting velocity energy to air within the chamber, and to effect this without any increase of the refrigerating load on the evaporator, and, in fact, at least to a degree, with assistance to the evaporator in taking care of that refrigerating load.

Apparatus of this character may be made effective for displacing devices such as the expansion valve since, by proper calibration of certain orifices controlling the flow of refrigerant to and from the evaporator in conjunction with the energy-converting devices, the flow of refrigerant at the different stages can be coordinated and adjusted to obtain the requisite differential temperature difference between the refrigerant at inlet to the evaporator and the refrigerant at outlet from the evaporator.

Other objects of this invention will be set forth hereinafter, or will be apparent from the description and the drawings, in which are illustrated a number of embodiments of apparatus for carrying out the invention.

The invention, however, is not intended to be restricted to any particular construction, or to any particular arrangement of parts, or to any particular application of any such construction, or any such arrangement of parts, or to any specific method of operation, or to any of the various details thereof, even where specifically shown and described herein, as the same may be modified in various particulars, or may be applied in many varied relations, without departing from the spirit and scope of the claimed invention, practical constructions embodying certain details of the invention being illustrated and described, but only for the purpose of complying with the requirements of the statutes for the disclosure of an operative embodiment, but without attempting to disclose all of the various forms and modifications in which the invention might be embodied.

On the drawings, in which the same reference characters refer to the same parts throughout, and in which is disclosed such practical constructions:

Fig. 2 is a vertical cross sectional view of the circulating device for the apparatus of Fig. 1, certain of the parts being shown in elevation for clarity;

Fig. 3 is an end elevational view on the line 3—3 of Fig. 2, the end wall being removed and parts crossed by the cross sectional line being shown hatched;

Fig. 5 is a detail cross sectional view illustrating the disposition of the stator and rotor blades of the turbine, together with the inlet wall.

Figure 1:
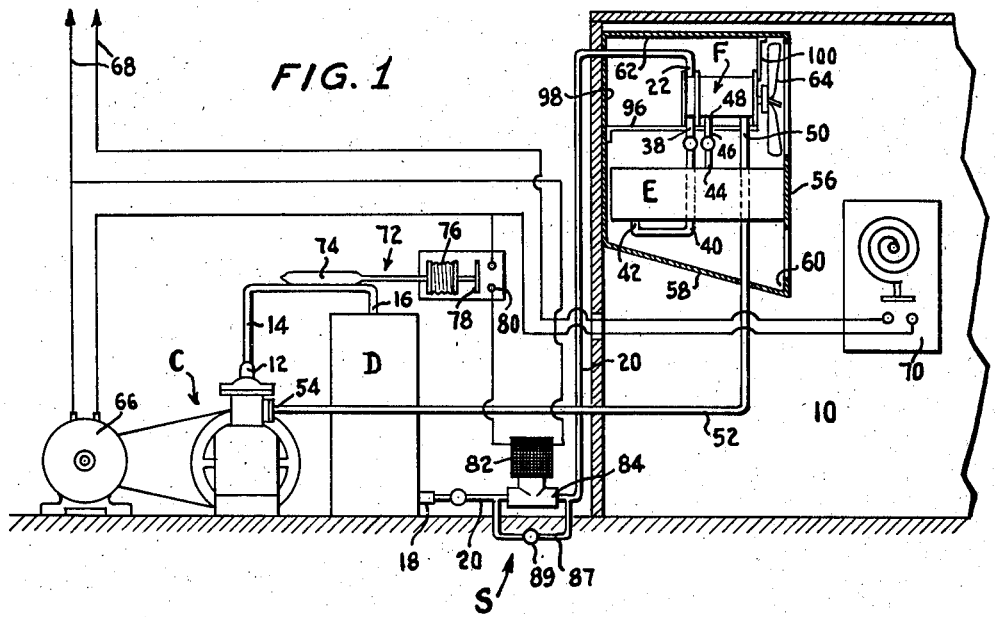
Fig. 1 is a diagrammatic elevational view, illustrating an arrangement of refrigerating apparatus embodying features of the invention, the chamber being shown with certain of the parts broken away in cross section.

In Fig. 1, a refrigerating system S has been illustrated diagrammatically to include compressor C, condenser D, evaporator E, and circulating device F. Also an expansion valve may be included in the association.

The compressor may be of any desirable construction, and preferably is located externally of a chamber 10 to be cooled, within which chamber evaporator E and circulating device F are located. From outlet 12 from the compressor, a conduit 14 leads to and is connected into inlet 16 of condenser D. This condenser may be of such type as may be necessary for getting rid of the heat of compression of the refrigerant, and may be cooled in any desired manner so that, at its outlet 18, refrigerant may be delivered to a conduit 20 for discharge into inlet 22 of circulating device F, the refrigerant at this stage preferably being substantially in liquid state.

Circulating device F is capable of construction in a number of different forms. One modification, as shown in Fig. 2, is illustrated to include a casing 24 defined by end walls 26 and 28, cooperating with side walls 30. A partition 32 may divide casing 24 into a plurality of compartments 34 and 36. The discharge of inlet 22 is into compartment 34. From outlet 38 from compartment 34, a conduit 40 leads away to inlet 42 to evaporator E. Outlet 44 from the evaporator, by a conduit 46, is connected to inlet 48 to compartment 36. The refrigerant, after passing through compartment 36 and its outlet 50, is conducted by a conduit 52 to inlet 54 of compressor C.

After the refrigerant in evaporator E has absorbed sufficient heat, the liquid refrigerant will have become substantially vaporized. In any event, however, the liquid refrigerant, as it vaporizes, and with the additional effect of reduced pressure from the suction of compressor C, will, in itself, be under a positive pressure gradient between evaporator and compressor. As the liquid refrigerant thus vaporizes, the evaporated refrigerant moves through outlet 44 out of the evaporator, into compartment 36 through inlet 48.

Evaporator E may take the form of a plurality of coils, or otherwise may be designed to utilize liquid refrigerant, retaining the refrigerant in heat-absorbing relationship to air within the chamber to be cooled. Evaporator E and device F, as shown, may be located generally at the upper portion of one side of the chamber so that it will be effective to cause cold air to fall therefrom in the chamber. However, as has been found in practice, such location of the cooling unit results in a dead space at the upper portion of the chamber, a space not effectively cooled except by conduction, because it is out of the direct path of the circulating air. A baffle wall 56 may be provided in association with the evaporator to facilitate the air circulation. Also a downwardly and angularly directed wall 58 may be positioned further to accentuate the circulation of air past evaporator E. Wall 58 may terminate in a gutter 60 to collect condensate which may drip off the surface of evaporator E. This is especially true where the evaporator is for the purpose of air-conditioning.

Refrigerant discharged from compartment 34 into the evaporator is there effective to absorb heat from air circulating past the evaporator. This circulation may be accentuated by locating device F so that it will drive air reversely of the usual direction of circulation, so that cold air will be blown across the top of chamber 10, to eliminate to a great extent any possible dead space at this part of the chamber. Baffle wall 62 may cooperate with circulating device F for the purpose of guiding air to fan 64 which may be mounted at the opening between wall 62 and the top edge of baffle wall 56 to facilitate this air circulation.

Motor 66, driving compressor C, may derive its power from mains 68. One of the mains may be connected to the motor through a thermostatic unit 70 in the chamber to be cooled. A control device 72 may be arranged on conduit 14 to be governed by the temperature of that conduit. If the compressor, as it pumps refrigerant into the condenser, should commence to receive refrigerant in liquid state from the evaporator, and to pump it into the condenser, the temperature of conduit 14 will drop, and suitably related means will break the circuit for motor 66 or, as shown in Fig. 1, cut off the flow of refrigerant from the condenser to the evaporator until such time as the temperature in conduit 14 again reaches a safe condition.

As diagrammatically shown in Fig. 1, control device 72 may comprise a sealed tube 74 containing an expansible fluid, the tube being connected to and opening into the interior of a bellows 76. Bellows 76 may carry a contactor 78 effective to close a circuit across points 80. One point may be connected to one main 68 through thermostatic unit 70, while the other point is connected to a solenoid 82, the other terminal of which may be connected directly to the other main 68. Solenoid 82, when energized, opens a valve 84 in conduit 20 leading from condenser D. Thus when slugs of refrigerant are being pumped by the compressor through conduit 14 and the temperature in that conduit drops, the circuit at points 80 will be opened, and valve 84 will close to prevent the passage of any further refrigerant to the evaporator, and thus to prevent the return to the compressor of any further liquid refrigerant.

The compressor, however, will continue to run as long as thermostatic unit 70 is effective to maintain the circuit of motor 66 closed. Compression in conduit 14, as the compressor takes refrigerant from the evaporator E and circulating device F, will finally raise the temperature of conduit 14 sufficiently to liberate it of the slugs, and normal circulation will commence when bellows 76 expands sufficiently to close the circuit across points 80 and to open valve 84. A by-pass 87 with a manually controlled valve 89 may be used when the apparatus is started on its first run.

Now, as appears from Fig. 1, refrigerant from condenser D, after passing valve 84, rises through conduit 20 to inlet 22. The refrigerant, at this stage, has been substantially liquefied. As shown in Fig. 3, the discharge from inlet 22 within circulating device F may be through a nozzle 86 which may be held in the walls of casing 24 to prevent escape of any refrigerant, and may be directed angularly so that the liquid refrigerant discharging therefrom will impinge upon an impeller wheel 88 within compartment 34. Nozzle 86 may comprise a removable thimble 91, so that thimbles with different orifices 93 may be provided in accordance with the refrigerating load. Thus nozzle 86 may be made to function as an expansion valve. Impeller wheel 88 may take any desired form; it is shown as having cups 90 formed or affixed in its periphery and so aligned with nozzle 86 that liquid discharged from nozzle 86 will impact with the maximum of action and reaction against the cups, and thereby function to turn wheel 88.

Casing 24 may be made up from a pair of sections 92 and 94. End faces of sections 92 and 94 may be secured on opposite sides of partition 32 so that the side walls of the sections will uniformly define side walls 30 for the casing, edges of the partition extending beyond walls 30. End walls 26 and 28 are secured at the opposite ends of the casing 24 thus formed, and to the free end faces of the side walls 30 of the casing. Soldering or similar methods may be used to make gas-tight and liquid-tight seals, and also to avoid corrosion arising from the action of the refrigerant. Walls 26 and 28 likewise may extend beyond walls 30, and provide means for resting device F upon cross members 96 in chamber 10, immediately above evaporator E, and secured to side wall 98 of the chamber. A vertical hanger 100, secured to the top wall of the chamber or to baffle wall 62, completes the support necessary for evaporator E and device F.

In the form of device F shown in Fig. 2, wheel 88 is fixed upon a shaft 102, which is mounted within casing 24 and is extended into compartment 34. Liquid discharged against wheel 88 by nozzle 86, and after serving to rotate shaft 102, leaves cups 90 and discharges through outlet 38 at the lower portion of compartment 34 into inlet 42.

Shaft 102 is tubular, having the form of a sleeve 104, upon which wheel 88 and turbine blades 106 are fixedly mounted. Sleeve 104, by means of a plurality of ball bearings 108, is permitted to rotate upon a rod 110, preferably of magnetic material, that is, soft iron or the like. This rod may constitute a brace for end walls 26 and 28 of the casing through which it extends. Its extensions are sealed to prevent escape from the casing of refrigerant, whether in liquid or gaseous state. Brace rods 112 may extend through the edge portions of end walls 26 and 28 and partition 32. A plate 113 is fixedly secured to sleeve 104 immediately adjacent end wall 28 so as to have secured to it a permanent magnet 114. This magnet, as well as its complementary magnet 116, may be of cast metal such as is now known as the Alnico magnet. Each magnet may be one piece, and have a plurality of arms 118 comprising poles for the magnet, and both magnets are preferably substantially identical in design and formation. Magnet 114 has its face 120 positioned as closely adjacent end wall 28 within the chamber of casing 24 as possible without interfering with its rotation.

Rod 110 extends outside of the casing through end wall 28, and has a bearing section 122 mounted on the extending end 124 which may include a ball bearing race. Secured fixedly with bearing section 122 may be a plate 123 to which is secured permanent magnet 116 which serves as a complement of magnet 114. Section 122, free to rotate on extending end 124, has fan blades 126 of fan 64 secured thereto in addition to magnet 116. An end collar 128 secured on rod 110 serves to prevent separation of section 122 from the rod.

Sleeve 104, which extends, in Fig. 2, into compartment 36, also extends through a plurality of disks 130 which are assembled in fixed relation to compartment 36 and to each other by engagement with suitable formations on side wall 30, and are anchored in position to define distinct stages 132. Within each stage is positioned a turbine blade 106. A bushing 133 is secured to partition 32 by any suitable means such as soldering, and provides additional support for sleeve 104, and also serves to cut down leakage between the compartments. A baffle plate 134 may be secured to sleeve 104 to be spaced from partition 32 but to be immediately adjacent an inlet wall 135 having orifices 137 to direct jets of gaseous refrigerant at the first turbine blade 106. Plate 134 serves to reduce leakage past the crevice between wall 135 and sleeve 104 by making it necessary for the gases to pass outwardly towards orifices 137. First, impeller wheel 88 is fixed on the end of sleeve 104, and the section of casing 92 between partition 32 and end wall 26 is made up. Bushing 133 is simultaneously located. Now baffle plate 134 may be secured in place on sleeve 104. The additional section 94 of casing 24 is brought into and secured in position, but end wall 28 is not as yet assembled. A spacer ring 136 is slipped down along sleeve 104 into abutment with plate 134, and a spacer ring 138 is slipped within section 94 into abutment with partition 32. Ring 138 has an opening to coincide with the opening from inlet 48. Inlet wall 135 is now located in abutment with ring 138, and is secured in position.

A turbine blade 106 is now slipped along sleeve 104 into abutment with ring 136. Blade 106 fits snugly against the sleeve, and may be sealed thereto by means such as soldering. At its outer periphery the blade is relieved sufficiently to permit of its free rotation within a ring 139 which is slipped into the casing and into abutment with inlet wall 135 already positioned. A disk 130 is now dropped into place. It will be noted that, at its outer periphery, disk 130 fits tightly into the casing against the outer walls, at which point the seal can be completed by such means as soldering. At the central portion the disk is relieved sufficiently not to bind against the sleeve as it rotates. Now another blade 106 may be moved into position in abutment with ring 136, and this assembly of blades, disks, and rings repeated until the last blade is mounted. Then magnet 114 is secured in position on sleeve 104, end wall 28 is secured in position so that its hub engages bearing 108 which thus acts as a thrust bearing, and section 122 with its fan blades are assembled in position.

Each blade 106 may be made as a stamping or otherwise to define turbine fins 140 to cooperate with stationary turbine fins 142 on stationary disks 130. The fins in the respective blades and disks are so directed that, as the gases pass through the several stages from inlet to outlet, a positive cooperation between the gases passing fins 142 into co-action with fins 140 will be produced so that the impulse and reaction of the expanding kinetic gases will cause blades 106 to rotate. After the gases have passed through the several stages of the turbine, they exit from compartment 36 through outlet 50 from device F and into conduit 52 to inlet 54 to the compressor.

Now as sleeve 104 is caused to rotate by the action of the refrigerant against wheel 88 and blades 106, a coupling will ensue between magnets 114 and 116. Consequently, magnet 116 will be caused to rotate and to carry blades 126 with it. The coupling, and the load upon blades 126, are such that the variations in speed of magnet 114 under the action of wheel 88 and blades 106 will result in synchronizing the motion of magnet 116. At the same time, the load placed on sleeve 104, because of the coupling between the magnets, will cause throttling of liquid and gases passing through device F, and thus, to a considerable degree, device F will comprise controlling means for the movement of the refrigerant through the evaporator. Also device F functions as an expansion valve as the liquid refrigerant passes through this control means. Under the control of nozzle 86 and of turbine blades 106 and wheel 88, as refrigerant is utilized at the evaporator, greater demands will be placed upon the compressor and the condenser, and greater volumes of liquid will be passed from the condenser past the nozzle into the evaporator, and then the gases will flow from the evaporator through the circulating device and back to the compressor, and at all times under the restraining action of the circulating device F. To a degree, therefore, device F can be considered to replace an expansion valve.

The result is that both the kinetic energy of the expanding gases as well as the kinetic energy of the liquid refrigerant moving into the evaporator are utilized for rotating shaft 102. Thus energy present in the liquid refrigerant and in the gaseous refrigerant is utilized for the purpose of driving the fan. This energy is derived from the heat of the substances to be refrigerated so that device F does not add to or subtract from the refrigerating efficiency of evaporator E and the condenser-compressor combination. At the same time, it does increase the refrigerating efficiency since stagnation is prevented as the air is rapidly circulated past the evaporator and the circulating device, while the apparatus does not have to account for the energy input of a fan driven by an electric motor which, by the heat units added to the chamber, reduces the efficiency of the evaporator.

Figure 4:
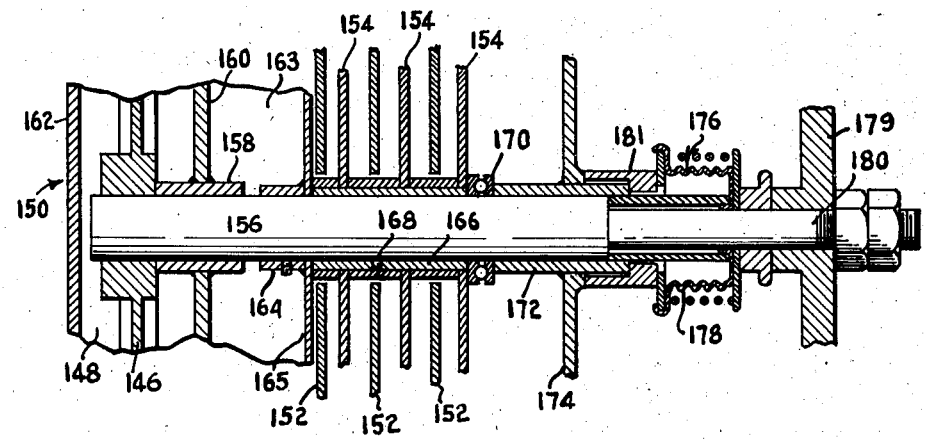
Fig. 4 is a detail vertical cross sectional view illustrating a modification of the assembly on the main shaft of the circulating device.

In the construction shown in Fig. 4, a nozzle similar to nozzle 86 discharges against a wheel 146, similar to wheel 88, in a compartment 148 of a casing 150. Also, stationary turbine blades 152 cooperate with rotary turbine blades 154 to drive a shaft 156. A suitable bushing 158 in partition 160, which with end wall 162 serves to define compartment 148, acts as one bearing for the shaft. Bushing 158 serves to seal off compartment 148 from compartment 163, and to reduce to a minimum leakage between the compartments. A collar 164 may be secured to shaft 156, and then baffle wall 165 is affixed to the shaft and against the end face of collar 164. A sleeve 166 is then adapted, by suitable means such as set-screws 168, to be fixed in relation to shaft 156 and abutting against wall 165. After the assembly of the wheel and the turbine blades, in the same manner as previously described but now upon sleeve 166, an end thrust bearing 170 may be secured on the shaft for engagement against a sleeve 172 which is fixed in and extends through end wall 174.

Shaft 156 may extend beyond end wall 174 into a sealing device 176, the specific structure of which need not be defined here. It may include a bellows 178 in conjunction with a sealing collar 181 snugly fitting around the extending end of sleeve 172 to prevent the escape of the refrigerant in the gaseous state through the opening in the end wall and around shaft 156. The blades of fan 179 may be secured on the extending end 180 of the shaft so that, as the shaft is rotated, the air in immediate adjacency to the evaporator and the circulating device will be placed in positive motion.

It is to be understood that device F may have a construction in which impulse for the fan is derived only from the liquid impact against the impeller wheel, or only from the action of the gases on the turbine blades.

Many other changes could be effected in the particular apparatus designed, and in the methods of operation set forth, and in specific details thereof, without substantially departing from the invention defined in the claims, the specific description being merely of operative embodiments capable of illustrating certain principles of the invention.

What is claimed as new and useful is:

1. In apparatus for cooling a compartment, means within the compartment for absorbing heat from the air in the compartment, means for supplying refrigerant to the heat-absorbing means, means for circulating air in the compartment, and means driven by the refrigerant being supplied to the heat-absorbing means and by spent refrigerant from the heat-absorbing means for driving the circulating means.

2. In apparatus for cooling a compartment, means within the compartment for absorbing heat from the air in the compartment, means for supplying refrigerant to the heat-absorbing means, means for withdrawing refrigerant from the heat-absorbing means, means for circulating air in the compartment, and means driven by refrigerant discharging from the supplying means and by refrigerant being discharged into the withdrawing means for driving the circulating means.

3. In apparatus for cooling a compartment, means within the compartment for absorbing heat from the air in the compartment, means for supplying refrigerant to the heat-absorbing means, means for withdrawing refrigerant discharged from the heat-absorbing means, means for circulating air in the compartment, and means in the compartment driven by refrigerant being discharged through the withdrawing means for driving the circulating means, the circulating means and the driven means being disposed to move the circulated air directly over the withdrawing means.

4. An evaporator for a refrigerating system utilizing liquid refrigerant, the evaporator having an inlet for the liquid refrigerant, means disposed immediately above and connected to the inlet for controlling the flow of refrigerant to the evaporator, the controlling means including an impeller wheel driven by the refrigerant flowing into the evaporator through said inlet, and means coupled to the impeller wheel for moving air past the evaporator in accordance with the controlled flow of liquid refrigerant to the evaporator.

5. An evaporator for a refrigerating system utilizing liquid refrigerant, the evaporator having an inlet and an outlet for the refrigerant, means disposed immediately above and connected to the inlet and to the outlet for controlling the flow of refrigerant to and from the evaporator, the controlling means including an impeller wheel driven by the refrigerant flowing into the evaporator through said inlet, and means coupled to the impeller wheel for moving air past the evaporator in accordance with the controlled flow of liquid refrigerant to the evaporator.

6. An evaporator for a refrigerating system utilizing liquid refrigerant, the evaporator having an inlet and an outlet for the refrigerant, means disposed immediately above and connected to the inlet and to the outlet for controlling the flow of refrigerant to and from the evaporator, the controlling means including impulse members driven by the refrigerant flowing into and out of the evaporator through said inlet and outlet, and means coupled to the impulse members for moving air past the evaportor in accordance with the controlled flow of refrigerant.

7. An evaporator for a refrigerating system utilizing liquid refrigerant, the evaporator having an outlet at its upper portion for the refrigerant, means disposed immediately above and connected to the outlet for controlling the flow of refrigerant to and from the evaporator, the controlling means including impulse members driven by the refrigerant flowing out of the evaporator through said outlet, and means coupled to the impulse members for moving air past the evaporator in accordance with the controlled flow of refrigerant.

8. An evaporator for producing cooling in an enclosure by utilizing liquid refrigerant, the evaporator including means for retaining liquid refrigerant in heat exchange relationship to the air of the enclosure, the retaining means having an inlet for the liquid refrigerant, means connected to the inlet for controlling the flow of refrigerant to the retaining means, the controlling means including means driven by the refrigerant flowing into the retaining means through said inlet, and means energized by the driven means for moving air past the retaining means in accordance with the controlled flow of refrigerant.

9. An evaporator for producing cooling in an enclosure by utilizing liquid refrigerant, the evaporator consisting of means for retaining liquid refrigerant in heat exchange relationship to the air of the enclosure, the retaining means having an inlet for the liquid refrigerant, means connected to the inlet for controlling the flow of refrigerant to the retaining means, the controlling means being in heat exchange relationship to the air of the enclosure and including means driven by the refrigerant flowing into the retaining means through said inlet, and means energized by the driven means for moving air past the retaining means in accordance with the controlled flow of refrigerant.

10. An evaporator for producing cooling in an enclosure by utilizing liquid refrigerant, the evaporator consisting of means for retaining liquid refrigerant and means for controlling the flow of refrigerant relative to the retaining means, both the retaining means and the controlling means being in heat exchange relationship to the air of the enclosure, and communicating means between the controlling means and the retaining means, the controlling means including means for driving air past the retaining means.

11. An evaporator for producing cooling in an enclosure by utilizing liquid refrigerant, the evaporator consisting of means for retaining liquid refrigerant and means for controlling the flow of refrigerant relative to the retaining means, both the retaining means and the controlling means being in heat exchange relationship to the air of the enclosure, means for moving air past the retaining means, and communicating means between the controlling means and the retaining means, the controlling means including a casing of heat-conducting material, the casing being divided into a plurality of compartments and comprising a housing, driven means within the housing, the driven means comprising means for actuating the air-moving means, the driven means including an impeller wheel within one of the compartments.

12. An evaporator for producing cooling in an enclosure by utilizing liquid refrigerant, the evaporator consisting of means for retaining liquid refrigerant and means for controlling the flow of refrigerant relative to the retaining means, both the retaining means and the controlling means being in heat exchange relationship to the air of the enclosure, means for moving air past the retaining means, and communicating means between the controlling means and the retaining means, the controlling means including a casing of heat-conducting material, the casing being divided into a plurality of compartments and comprising a housing, driven means within the housing, the driven means comprising means for actuating the air-moving means, one of the compartments being connected by the communicating means with the inlet to the retaining means, the driven means including an impeller wheel within said compartment.

13. An evaporator for producing cooling in an enclosure by utilizing liquid refrigerant, the evaporator consisting of means for retaining liquid refrigerant and means for controlling the flow of refrigerant relative to the retaining means, both the retaining means and the controlling means being in heat exchange relationship to the air of the enclosure, means for moving air past the retaining means, and communicating means between the controlling means and the retaining means, the controlling means including a casing of heat-conducting material, the casing being divided into a plurality of compartments and comprising a housing, driven means within the housing, the driven means comprising means for actuating the air-moving means, one of the compartments being connected by the communicating means with the inlet to the retaining means and certain of the compartments being connected with the outlet from the retaining means, the driven means including an impeller wheel and a gas turbine within certain of the compartments.

14. An evaporator for producing cooling in an enclosure by utilizing liquid refrigerant, the evaporator consisting of means for retaining liquid refrigerant and means for controlling the flow of refrigerant relative to the retaining means, both the retaining means and the controlling means being in heat exchange relationship to the air of the enclosure, means for moving air past the retaining means, and communicating means between the controlling means and the retaining means, the controlling means including a casing of heat-conducting material, the casing being divided into a plurality of compartments and comprising a housing, driven means within the housing, the driven means comprising means for actuating the air-moving means, one of the compartments being connected by the communicating means with the inlet to the retaining means and certain of the compartments being connected with the outlet from the retaining means, the driven means including an impeller wheel within the compartment communicating with the inlet to the retaining means and a gas turbine within the other compartments.

ANDREW SÁNCHEZ.